United States Patent
Bhattacharya et al.

(10) Patent No.: US 9,411,708 B2
(45) Date of Patent: Aug. 9, 2016

(54) SYSTEMS AND METHODS FOR LOG GENERATION AND LOG OBFUSCATION USING SDKS

(71) Applicants: Sourav S. Bhattacharya, Fountain Hills, AZ (US); Anirban Bhattacharya, Bangalore (IN); Kuldip Shetty, Sastan (IN); Krishna Muraleedharan Prasad, Bangalore (IN); Ravi Udaya Kumble, Bangalore (IN); Venu Aluri, Gudlavalleru (IN); Vitesh Patel, Bangalore (IN)

(72) Inventors: Sourav S. Bhattacharya, Fountain Hills, AZ (US); Anirban Bhattacharya, Bangalore (IN); Kuldip Shetty, Sastan (IN); Krishna Muraleedharan Prasad, Bangalore (IN); Ravi Udaya Kumble, Bangalore (IN); Venu Aluri, Gudlavalleru (IN); Vitesh Patel, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 122 days.

(21) Appl. No.: 13/970,203

(22) Filed: Aug. 19, 2013

(65) Prior Publication Data

US 2014/0310679 A1    Oct. 16, 2014

(30) Foreign Application Priority Data

Apr. 12, 2013    (IN) ............................ 1659/CHE/2013

(51) Int. Cl.
*G06F 11/34* (2006.01)
*G06F 11/36* (2006.01)

(52) U.S. Cl.
CPC ........ *G06F 11/362* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 6,106,571 | A  * | 8/2000 | Maxwell | 717/131 |
| 6,668,325 | B1   | 12/2003 | Collberg et al. | |
| 6,694,456 | B1 * | 2/2004 | Ludwig | 714/38.1 |
| 6,968,540 | B2 * | 11/2005 | Beck et al. | 717/130 |
| 7,237,232 | B2   | 6/2007 | Smith | |
| 7,512,933 | B1 * | 3/2009 | Tortosa et al. | 717/124 |
| 8,108,689 | B2 * | 1/2012 | Nicolson et al. | 713/190 |
| 2004/0153878 | A1 * | 8/2004 | Bromwich et al. | 714/48 |
| 2004/0181670 | A1 * | 9/2004 | Thune et al. | 713/176 |

(Continued)

OTHER PUBLICATIONS

Apache CXF, "Debugging and Logging," http://cxf.apache.org/docs/debugging-and-logging.html (Sep. 11, 2009).

(Continued)

*Primary Examiner* — Lewis A Bullock, Jr.
*Assistant Examiner* — Bruce S Ashley
(74) *Attorney, Agent, or Firm* — Finnegan, Henderson, Farabow, Garrett & Dunner, L.L.P.

(57) ABSTRACT

This disclosure generally relates to application development platforms, and more particularly to systems and methods for log generation and log obfuscation using software development kits (SDKs). In one embodiment, an application logging configuration method is disclosed, comprising: obtaining, for an application, a developer-specific log generation schema specifying at least a developer-specific set of variables to be logged and associated code line numbers; obtaining a developer-independent log generation schema specifying at least a developer-independent set of variables to be logged and associated code line numbers; extracting the specifications of the developer-specific and developer-independent sets of variables to be logged and associated code line numbers; generating an application logging schema specifying at least a combination of the developer-specific and developer-independent sets of variables to be logged and associated code line numbers; and storing the application logging schema.

28 Claims, 10 Drawing Sheets

(56) References Cited

U.S. PATENT DOCUMENTS

2005/0028145 A1* 2/2005 Kang et al. .................... 717/128
2006/0259830 A1* 11/2006 Blevin et al. .................... 714/45
2009/0132419 A1* 5/2009 Grammer et al. .............. 705/50
2011/0167474 A1* 7/2011 Sinha et al. ........................ 726/1
2013/0227528 A1* 8/2013 Mathew et al. ............... 717/124

OTHER PUBLICATIONS

Axiologic Research SRL, "C/C++ Obfuscators," http://www.obfuscator.info/c_cpp_obfuscators.html (Oct. 31, 2007).
Aziz, A., "Tracing—Logging—Monitoring," http://sharptoolbox.com/categories/tracing-logging-monitoring (Jan. 13, 2005).
Chan, J-T. et al., "Advanced Obfuscation Techniques for Java Bytecode," The Journal of System and Software, 71, pp. 1-10 (2004).
Codeguru, "What is Obfuscation?," http://forums.codeguru.com/showthread.php?375616-.NET-Framework-IL-What-is-Obfuscation (Feb. 13, 2006).
DMOZ Open Directory Project, "Obfuscation and Ecryption," http://www.dmoz.org/Computers/Programming/Languages/PHP/Development_Tools/Obfuscation_and_Encryption/ (Aug. 4, 2010).
Google Analytics, "Analyze Your Data," https://support.google.com/analytics/ (2013).
IBM, "Logging with the Java Persistence API (JPA) and the application server," http://pic.dhe.ibm.com/infocenter/wasinfo/v6r1/index.jsp?topic=%Fcom.ibm.websphere.ejbfep.multiplatform.doc%2Finfo%2Fae%2Fae%2Ftejb_loggingwjpa.html (Jul. 3, 2013).
Johnstone, C., "Microsoft Lync 2010 Client Logging," http://blog.insidelync.com/2011/10/microsoft-lync-2010-client-logging/ (Oct. 24, 2011).
Microsoft, "Using the Windows Deployment Services Client API," http://msdn.microsoft.com/en-us/library/windows/desktop/bb530731%28v=vs.85%29.aspx (Jun. 12, 2013).
Paul, J., "Top 10 tips on logging in Java," http://javarevisited.blogspot.com/2011/05/top-10-tips-on-logging-in-java.html (May 2, 2011).
Remotesoft, Inc., "Salamander .NET Obfuscator," http://www.remotesoft.com/salamander/obfuscator.html (2011).

\* cited by examiner

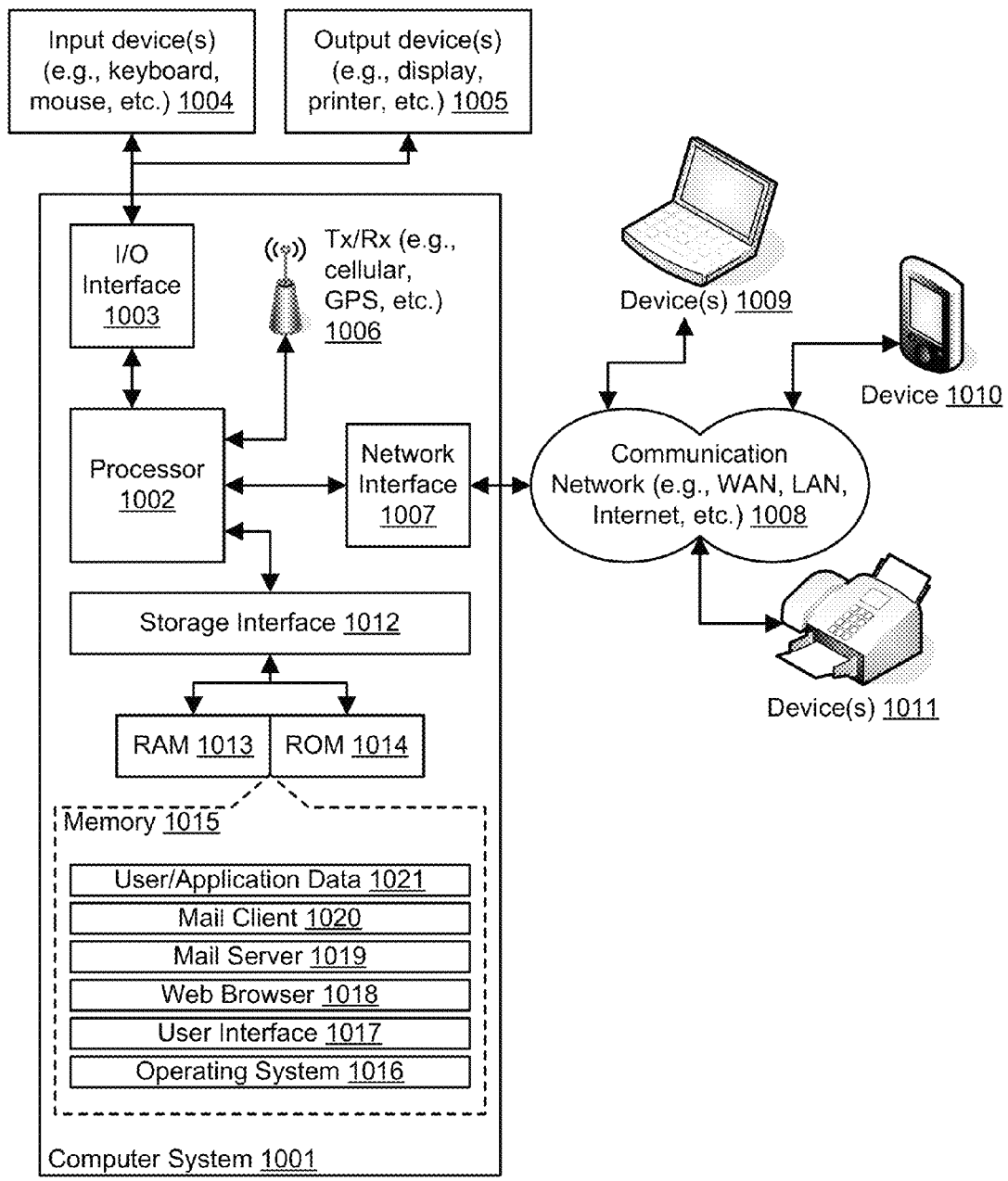
FIG. 10: Exemplary Computer System

SYSTEMS AND METHODS FOR LOG GENERATION AND LOG OBFUSCATION USING SDKS

PRIORITY CLAIM

This U.S. Patent Application claims priority under 35 U.S.C. §119 to: India Application No. 1659/CHE/2013, filed Apr. 12, 2013, and entitled "Systems and Methods for Log Generation and Log Obfuscation using SDKs." The aforementioned application is incorporated herein by reference in its entirety.

TECHNICAL FIELD

This disclosure generally relates to application development platforms, and more particularly to systems and methods for log generation and log obfuscation using software development kits (SDKs).

BACKGROUND

Software application developers use application development platforms (e.g., Software Development Kits (SDKs)) to write software applications. An SDK is a collection of software used for developing applications for a specific end use, for example, a specific device or an operating system. Examples of SDKs include, without limitation, the Java SDK, the Mac OS X SDK, and the iPhone SDK. SDKs may also include an integrated development environment (IDE), which provides a programming window for writing source code, a debugger for fixing program errors, and a visual editor. IDEs may also include a compiler, which is used to create applications from source code files.

Once the applications are written, they are continuously maintained, for example to remove bugs and plug security loopholes. Therefore, application developers often configure the applications to generate logs during execution, as the generated logs help them to better understand the application execution behavior and debugging. Further, it is important to keep the generated logs secure. However, application developers tend to have different security requirements and preferences.

SUMMARY

In one embodiment, an application logging configuration method is disclosed, comprising: obtaining, for an application, a developer-specific log generation schema specifying at least a developer-specific set of variables to be logged and associated code line numbers; obtaining a developer-independent log generation schema specifying at least a developer-independent set of variables to be logged and associated code line numbers; extracting the specifications of the developer-specific and developer-independent sets of variables to be logged and associated code line numbers; generating an application logging schema specifying at least a combination of the developer-specific and developer-independent sets of variables to be logged and associated code line numbers; and storing the application logging schema.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 10 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

An application logging configuration system is disclosed. The application logging configuration system includes a processor and a memory device operatively connected to the processor. The memory device storing processor-executable instructions for obtaining, for an application, a developer-specific log generation schema specifying at least a developer-specific set of variables to be logged and associated code line numbers. Further, memory device storing processor-executable instructions for obtaining a developer-independent log generation schema specifying at least a developer-independent set of variables to be logged and associated code line numbers. Also, the memory device storing processor-executable instructions for extracting the specifications of the developer-specific and developer-independent sets of variables to be logged and associated code line numbers; generating an application logging schema specifying at least a combination of the developer-specific and developer-independent sets of variables to be logged and associated code line numbers; and storing the application logging schema.

Figure 1:
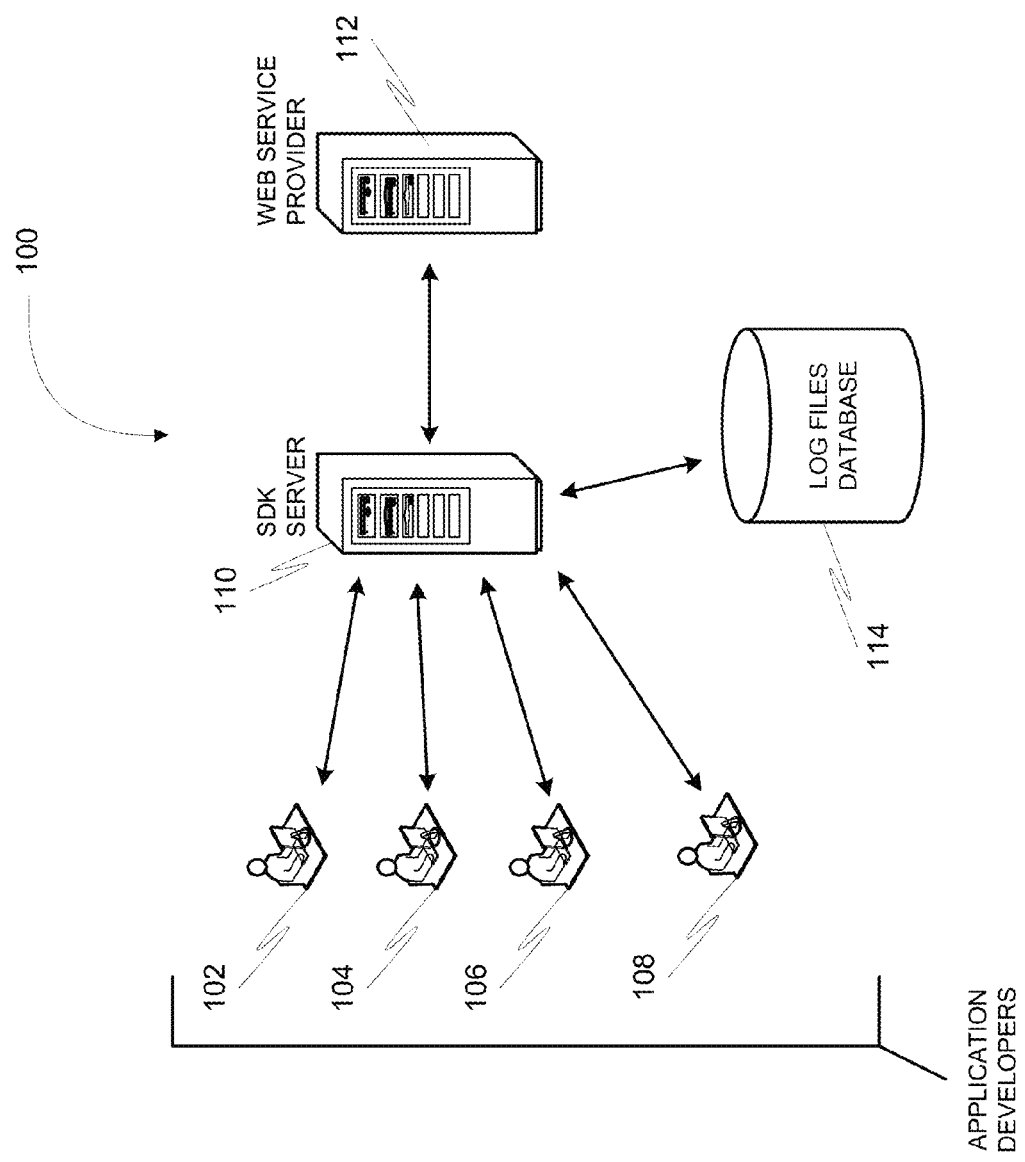
FIG. 1 illustrates exemplary aspects of an application logging configuration system according to some embodiments of the present disclosure.

FIG. 1 illustrates exemplary aspects of an application logging configuration system according to some embodiments of the present disclosure. The system 100 may include application developers 102, 104, 106 and 108, and an SDK server 110. In one embodiment, there may be multiple SDK servers, each server serving one or more application developers 102, 104, 106 and 108. The application developers 102, 104, 106 and 108 may be logically conjoined with the SDK Server 110:

they represent the human developers which may or may not map one-on-one to specific applications that are being coded. The application developers 102, 104, 106 and 108 may develop software product suites using the modules predefined in the SDK hosted at the SDK server 110. Further, stakeholders common to all the application developers may be conjoined with the SDK server 110. The stakeholders may include an Information Technology (IT) department or a legal department of the company that is providing the resources (e.g., paying the salaries of the application developers) for the application development.

The system 100 further may include, without limitation, a back plane web service provider 112 and a log files database 114. Each SDK server may use an independent log files database. The back plane web service provider 112 provides a web application service for the users.

The SDK server 110 may include a processor and a memory device operatively connected to the processor. The memory device may store processor-executable instructions to implement the application logging configuration. The generated logs may be sent to log files database 114. Application logging configuration is explained in further detail in conjunction with FIGS. 2 and 3 below.

Figure 2:
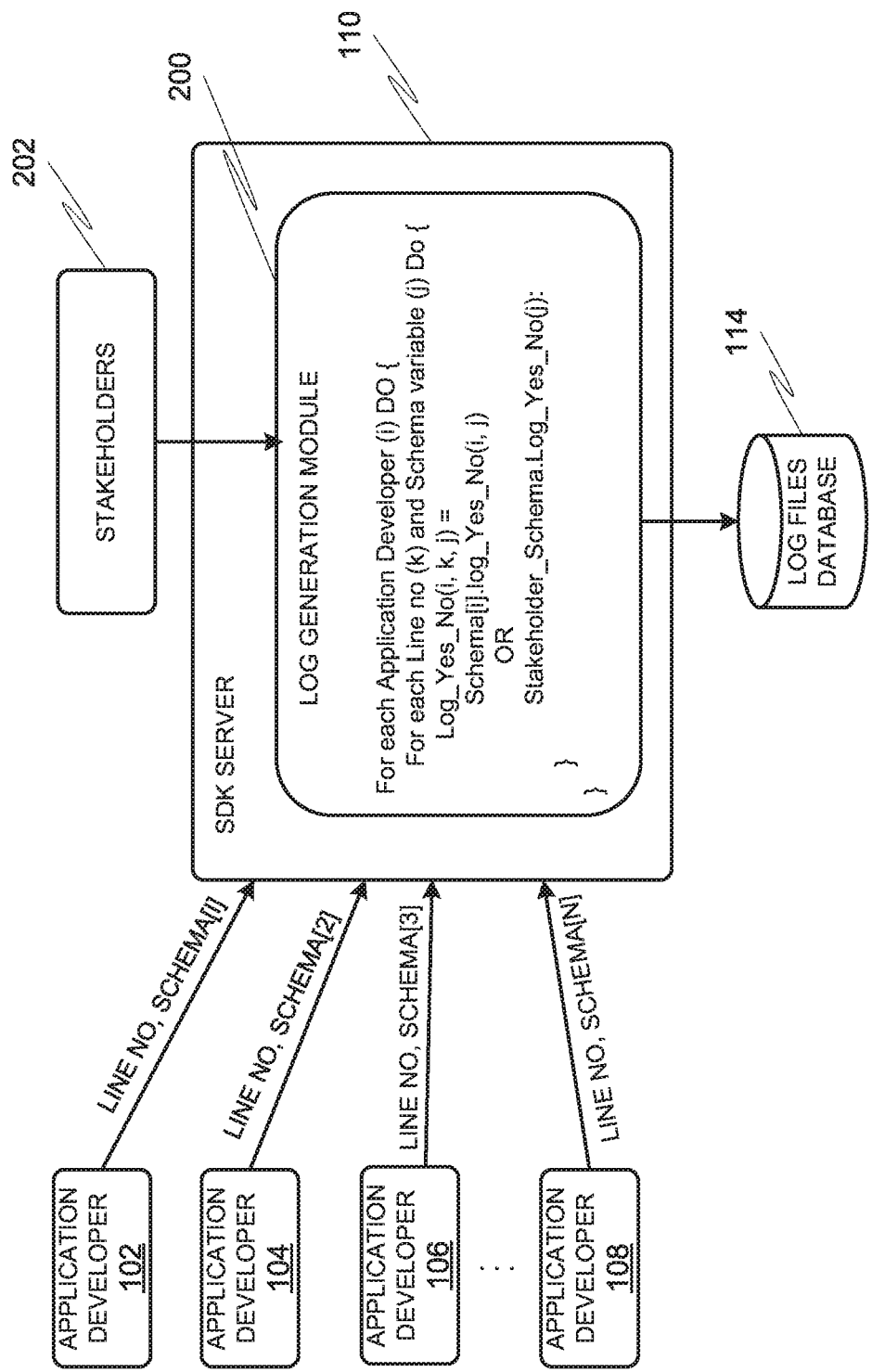
FIG. 2 is a block diagram of a log configuration module according to an exemplary embodiment of the present disclosure.

FIG. 2 is a block diagram of a log configuration module 200 according to an exemplary embodiment of the present disclosure. In one embodiment, the log configuration module 200 may be implemented by the processor and the memory device in the SDK server 110, wherein the memory device is operatively connected to the processor and may store processor-executable instructions to implement the log configuration module 200.

Each application developer 102-108 may specify individual logging requirements using a developer-specific log generation schema specifying at least a developer-specific set of variables to be logged and associated code line numbers. Further, stakeholder 202 may also specify their requirements using a developer-independent log generation schema specifying at least a developer-independent set of variables to be logged and associated code line numbers. The application developers 102-108 and the stakeholder 202 may specify their requirements using a schema which dictates the log generation, storage and retrieval. The schema may also specify the keys (primary, secondary and others as needed) as well as the database (which stores the log) structure, enabling query support for debugging and triage.

The log configuration module 200 may obtain the per-line based schema specified by the each application developer (indicated by the variable 'i' in FIG. 2). The schema may be comprised of a Log_Yes_No Boolean variable for each data type (indicated by the variable 'j' in FIG. 2), which indicates whether or not variables of that particular data type are to be logged. If the Boolean value=yes, for example for the data type string, then all string variables may have to be logged. The entire schema may be a list of Boolean values, one for each data type. The schema obtained from an application developer may be unique and personalized as per the log generation requirement of the application developer.

Also, one application developer may specify multiple schemas, e.g., one for each specific line number (indicated by the variable 'k' in FIG. 2). The ability to provide a line number specific log generation, along with a log generation directive on a per data type basis may provide complete flexibility for log generation.

Moreover, a stakeholder 202 (e.g., a beneficiary or implementer of the service and/or system) may specify a baseline policy log generation requirement (using the developer-independent log generation schema) applicable across all the application developers. The format of the stakeholder schema may be the same as with the schema for each one of the application developers, i.e., it provides a Boolean value (Yes or No) for each one of the data types.

After obtaining the log generation schema, the log configuration module 200 may extract the specifications of the developer-specific and developer-independent sets of variables to be logged and associated code line numbers. In an embodiment, one of the developer-specific set of variables to be logged and associated code line numbers; and the developer-independent set of variables to be logged and associated code line numbers, may be a null set. Thus, in such embodiments, only developer-specific set of variables, or developer-independent set of variables (e.g., as specified by the stakeholder) may be logged.

Next, the log configuration module 200 may generate an application logging schema specifying a combination of the developer-specific and developer-independent sets of variables to be logged and associated code line numbers. In one embodiment, the log configuration module 200 may perform 'OR' operations to determine which line numbers of the code written by the application developers 102, 104, 106 and 108 match the stakeholder's 202 requirement according to the data-type and variable defined in the schema. An example of pseudo code for the combining logic is provided below:

```
For each Application Developer (i) DO {
    For each Line no (k) and Schema variable (j) Do {
        Log_Yes_No(i, k, j) =
            Schema[i].log_Yes_No(i, j)
            OR
            Stakeholder_Schema.Log_Yes_No(j):
    }
}
```

Figure 3:
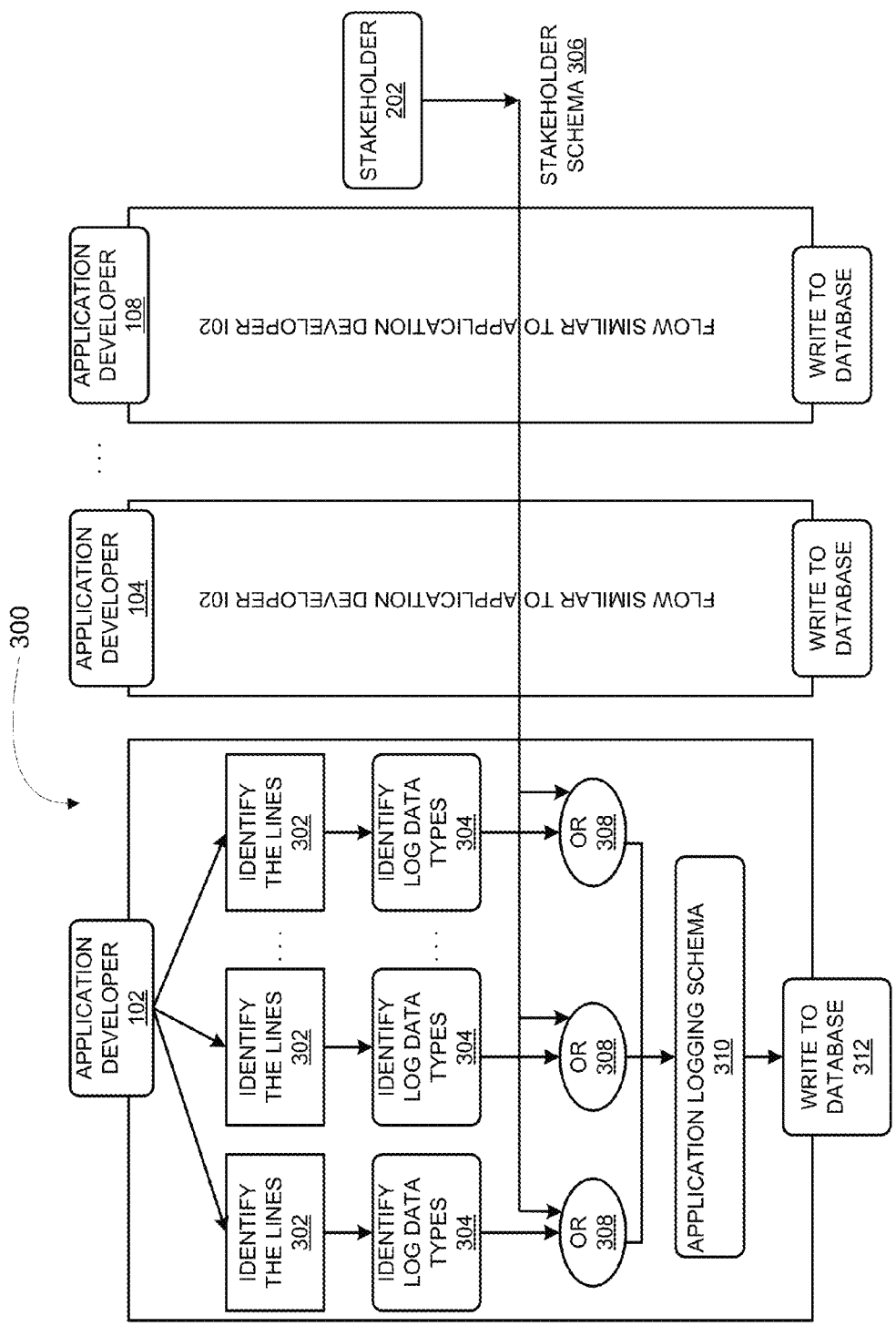
FIG. 3 is a flow diagram of a log configuration method according to some embodiments of the present disclosure.

FIG. 3 is a flow diagram of a log configuration method 300 according to some embodiments of the present disclosure. The method 300 illustrates the steps followed by the log configuration module 200 when it may obtain schema from the application developer 102.

At step 302, the log configuration module 200 may identify the lines for log generation for each schema obtained from the application developer 102. Next, at step 304, the log configuration module 200 may identify the log data types to be logged. If the Boolean value=yes, for example for the data type String, then all String variables are to be logged. Then the log configuration module 200 may obtain the stakeholder schema from the stakeholder 202 at step 306. The stakeholder's schema may define baseline data log generation requirements applicable across all of the application developers.

Thereafter, at step 308, the log configuration module 200 may use the 'OR' operation to combine the schemas of the application developer 102 and the stakeholder 202. At step 310, this may generate the application logging schema for the application developer 102 which is then stored at step 312. In an embodiment, the application logging schema may be stored in the database 114.

Further, if there are 10 application developers, then there may be 10 application logging schemas. The nth application logging schema per data type may be an 'OR' relationship between the nth application developer's schema and the stakeholder's schema. Furthermore, the nth application logging schema may comprise one or more application logging schemas per line number. The log configuration module 200 may execute similar steps for the schemas received from the application developers 104 and 108.

Figure 4:
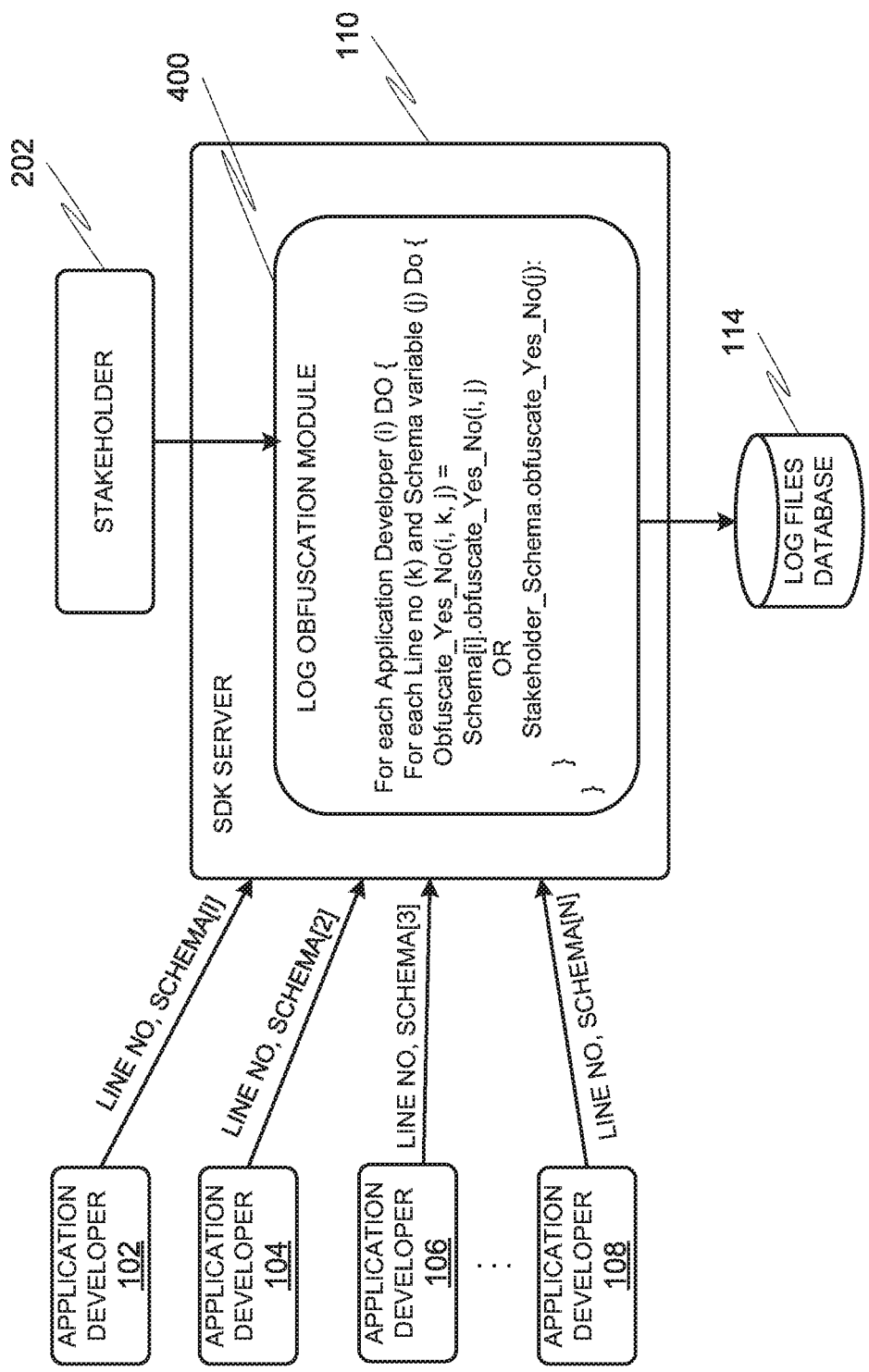
FIG. 4 is a block diagram of a log obfuscation module in accordance with some embodiments.

FIG. 4 is a block diagram of a log obfuscation module 400 (which may work similar to the log configuration module 200) in accordance with some embodiments. The log obfuscation module 400 may be part of the SDK server 110, therefore, it may implement obfuscation at the SDK level, which may be entirely detached from platform (programming language, OS, browser etc.) related obfuscations. Further, since the SDK may implement the obfuscation, it may be entirely effortless from the perspective of application developers. Since the application developers may specify how and where to obfuscate, the resultant logs may be unintelligible to log data mining attackers and also private from other applications, as one application may not know the coding method used by another application.

The log obfuscation module 400 may be implemented by the processor and the memory device in the SDK server 110. The memory device may be operatively connected to the processor and stores processor-executable instructions to implement the log obfuscation module 400.

The log obfuscation module 400 may obtain a developer-specific log obfuscation schema from application developers, specifying a developer-specific set of variables to be obfuscated and associated code line numbers. Further the module 400 may obtain a developer-independent log obfuscation schema from stakeholders, specifying a developer-independent set of variables to be obfuscated and associated code line numbers. Then, the module 400 may extract the specifications of the developer-specific and developer-independent sets of variables to be obfuscated and associated code line numbers. In an embodiment, the developer-specific set of variables to be obfuscated and associated code line numbers; and the developer-independent set of variables to be obfuscated and associated code line numbers, may be a null set.

Next, the module 400 may generate a log obfuscation schema specifying a combination of the developer-specific and developer-independent sets of variables to be obfuscated and associated code line numbers. The generation of log obfuscation schema is described in detail in conjunction with FIG. 5 below.

In one embodiment, the module 400 may adopt a combining logic with the schema obtained from the application developers the stakeholder to identify the variables that need to be obfuscated. The module 400 may perform 'OR' operations between the per line schema obtained from the application developers with the per line schema provided by the stakeholder to generate a log obfuscation schema. An example of pseudo code for the combining logic is provided below:

```
For each Application Developer (i) DO {
    For each Line no (k) and Schema variable (j) Do {
        Obfuscate_Yes_No(i, k, j) =
            Schema[i].obfuscate_Yes_No(i, j)
            OR
            Stakeholder_obfuscate.Log_Yes_No(j):
    }
}
```

Finally, the module 400 may store the log obfuscation schema. In an embodiment, it may be stored in the database 114. Further, the application log schema and log obfuscation schema may be stored as a single schema.

In an embodiment, the log obfuscation schema may also specify an obfuscation method associated with a variable to be obfuscated. The obfuscation method associated with the variable to be obfuscated may include, without limitation, one of replacing a variable name with a numeric code, replacing Personally Identifiable Information (PII) with a token or replacing a data attachment with metadata. The obfuscation method may also include encryption using an application-specific key.

Figure 5:
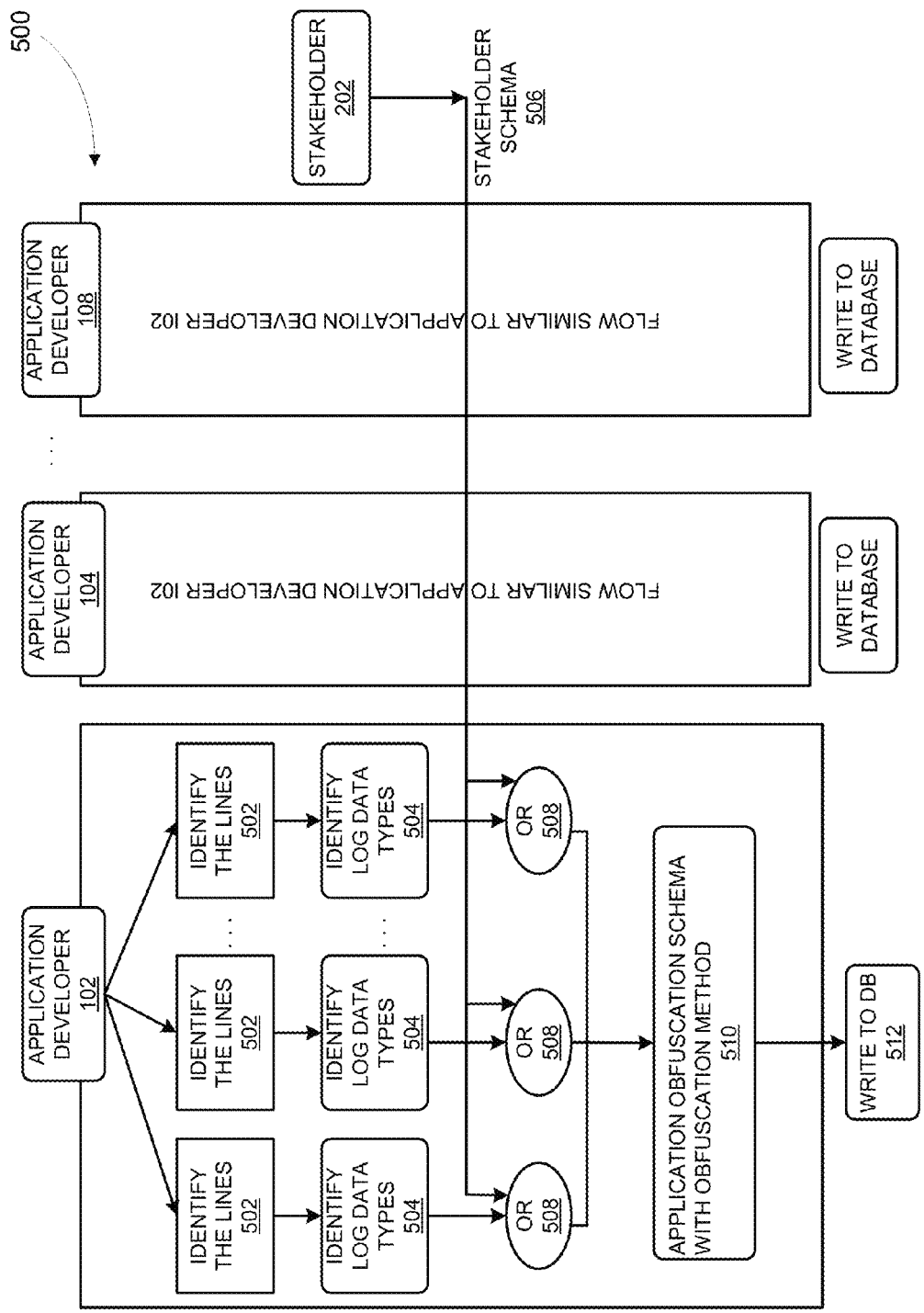
FIG. 5 is a flow diagram of a log obfuscation method according to some embodiments of the present disclosure.

FIG. 5 is a flow diagram of a log obfuscation method 500 (similar to the log configuration method 300) according to some embodiments. The method 500 may generate log obfuscation schema. The method 500 illustrates the steps followed by the log obfuscation module 400 when it may obtain a schema from the application developer 102. The stakeholder 202 may specify a common log obfuscation requirement across all the application developers.

The application developers 102, 104 and 108 may specify their schemas for the various lines of code, which may be then obtained by the log obfuscation module 400. At step 502, the log obfuscation module 400 may identify the lines for log obfuscation for each schema received from the application developer 102. Next, at step 504, the log obfuscation module 400 may identify the log data types to be obfuscated. If the Boolean value=yes, for example for the data type String, then all String variables are to be obfuscated. At step 506, the stakeholder 202 may provide the stakeholder schema to the log obfuscation module 400. The stakeholder schema may define baseline data log generation requirements applicable across all the application developers. Thereafter, at step 508, the log obfuscation module 400 may use the 'OR' operation to combine the schemas of the respective application developers and the stakeholder 202. This may generate a specific log obfuscation format for each application developer.

At step 510, the log obfuscation schema for the application developer 102 may be generated. The log obfuscation schema may also include the selected log obfuscation method. The generated log obfuscation schema may be then stored at step 512. In an embodiment, the application logging schema may be stored in the database 114.

Further, if there are 10 application developers, then there may be 10 log obfuscation schemas. The nth log obfuscation schema per data type may be an 'OR' relationship between the nth application developer's schema and the stakeholder's schema. Furthermore, the nth log obfuscation schema may comprise one or more log obfuscation schema per line number. The log obfuscation module 400 may execute similar steps for the schemas received from the application developers 104 and 108.

An application logging system is disclosed. In an exemplary embodiment, the application logging system may be implemented by the processor and the memory device in the SDK server 110. The memory device may be operatively connected to the processor and stores processor-executable instructions to implement the application logging system. The SDK server 110 may receive an Application Programming Interface (API) call for a service hosted by the back plane web service provider 112. The SDK server 110 may capture the API calls 118 and then forward the same to the back plane web service provider 112. In another embodiment, the SDK server 112 may be co-located at an enterprise level software gateway tunneling all API calls from within the enterprise from/to the Internet.

In an exemplary embodiment, an application developer may send an API call (e.g., as a HTTP POST request) to the application server. An example API call is provided below:

```
POST /rest/n_apiname HTTP/1.1
Host: api.webservice1.com
Content-Type: application/x-www-form-urlencoded
```

-continued

```
Content-Length: 46
api_key=213456543¶msXML=<?xml version='1.0'
    encoding='UTF-8' standalone='yes'?><user_ID>jqpublic
    </user_ID><timestamp>2017-03-21:01:21:34</timestamp>
    <input_type>mouse</input_type><value>123:45:56</value>
    <trigger>on-click</trigger>
```

Although the API call may be ultimately intended to be provided to the back plane web service provider 112, the API call may be directed to the SDK server 110 instead. For example, in the API call above, "www.webservice1.com" may point to the SDK server 110 rather than the back plane web service provider 112. In alternative embodiments, the API call may be addressed to the back plane web service provider 112 itself, but the SDK server may be configured to intercept the API call before the API call is read by a web service application executing on the back plane web service provider 112.

After receiving the API call, the application logging system may parse the API call to extract at least one of an API call name and one or more API call parameters. Then, it may generate a log entry, using the at least one of the API call name and the one or more API call parameters. The log entry may be generated, in accordance with the application logging schema (generated by the log configuration module 200) specifying a developer-specific set of variables to be logged and associated code line numbers, and a developer-independent set of variables to be logged and associated code line numbers. In an embodiment, the developer-specific set of variables to be logged and associated code line numbers; and the developer-independent set of variables to be logged and associated code line numbers, may be a null set. Finally, the generated log entry may be stored in the database 114.

After generating the log entry, the application logging system may obfuscate at least a portion of the log entry in accordance with a log obfuscation schema (generated by the log obfuscation module 400) specifying at least a developer-specific set of variables to be obfuscated and associated code line numbers and a developer-independent set of variables to be obfuscated and associated code line numbers. The application log schema and log obfuscation schema may be stored as a single schema. In an embodiment, one of the developer-specific set of variables to be obfuscated and associated code line numbers; and the developer-independent set of variables to be obfuscated and associated code line numbers, may be a null set.

Further, the log obfuscation schema may also specify an obfuscation method associated with a variable to be obfuscated. The obfuscation method associated with the variable to be obfuscated may include one of: replacing a variable name with a numeric code; replacing personally identifiable information with a token; or replacing a data attachment with metadata. Further, the obfuscation method may include encryption using an application-specific key.

The memory device of the SDK server 110 may further store instructions for generating at least one of a new API call name (known as, lexical rerouting or Dynamic-Link Library (DLL) rerouting), or a new API call address (known as Internet Protocol (IP) address rerouting), using the extracted at least one of the API call name or the one or more API call parameters. Thereafter, a new API call may be generated for the service using the generated new API call name or the new API call address. Finally, providing the generated new API call for the service.

In case of IP rerouting, the new API call address may be generated, by providing the API call name as input to a lookup table; however, the API call name for the generated new API call may be the same as the API call name. Therefore, an API named <APIname> may be called <APIname> but it may direct the API reference to a new IP address to call a different service. Only the listed and designated API calls may get rerouted, other traffic remaining untouched. This is explained in further detail in conjunction with FIG. 6 below.

In case of lexical rerouting, a new API call name may be generated, by extracting a string subset of the API call name; however, an API call address for the generated new API call may be the same as an API call address for the received API call for the service. Therefore, an API named <APIname> may be renamed <APIname_n>; however, the new API call may be forwarded to the original intended web server's IP address, with the same set of API parameters. Again, only the listed and designated API calls may get rerouted, all other traffic may be untouched. This is explained in further detail in conjunction with FIG. 8 below.

In some embodiments, both IP and lexical rerouting may be performed simultaneously, whereas in alternative embodiments, only one or the other may be performed.

Figure 6:
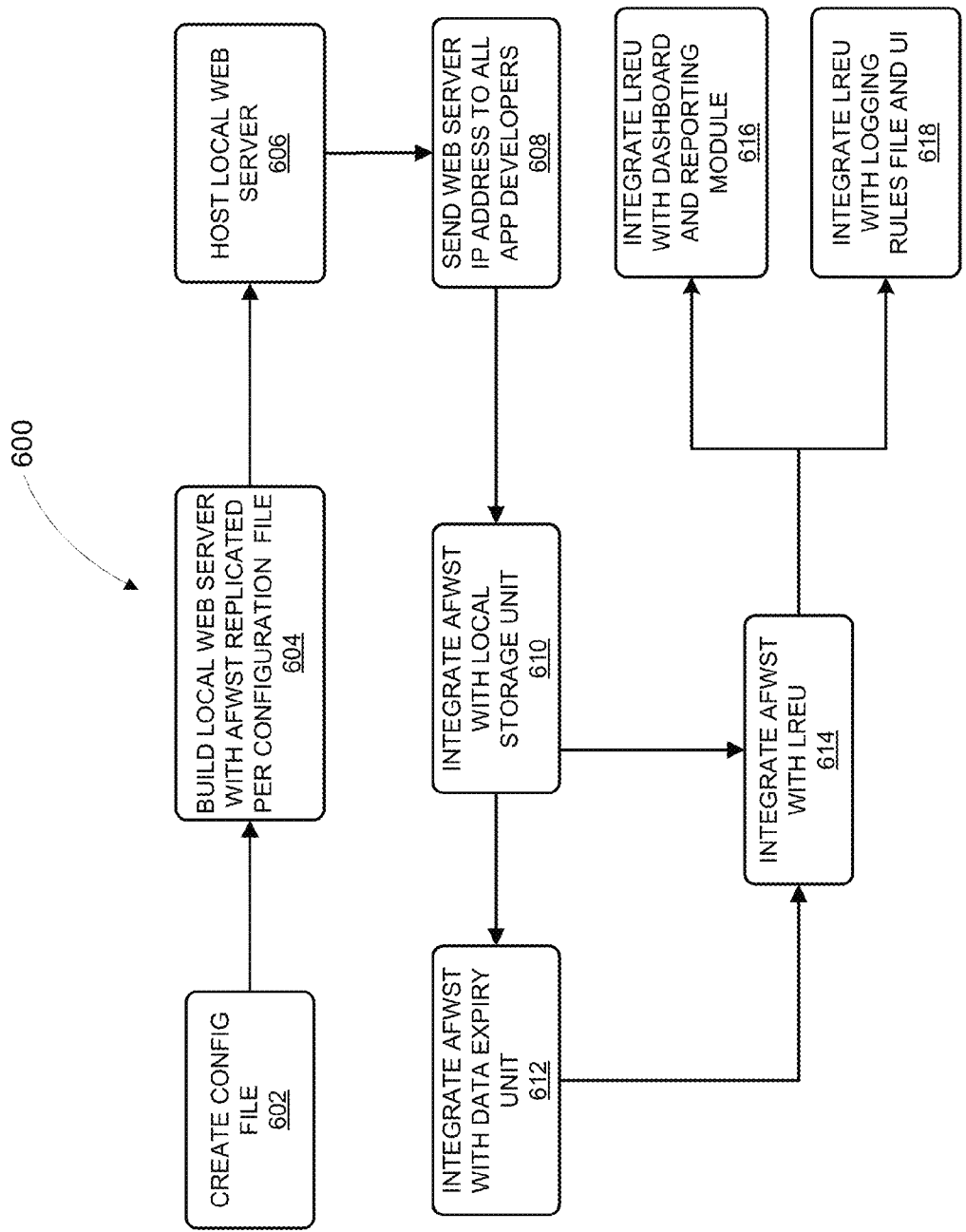
FIG. 6 is a flow diagram of a method for deployment of IP rerouting configuration according to some embodiments of the present disclosure.

FIG. 6 is a flow diagram of a method 600 for deployment of an IP rerouting configuration according to some embodiments. The IP rerouting structure obtained once the method 600 is executed is explained in detail in conjunction with FIG. 8 below. At step 602, the method 600 may create a configuration file as per the list of API names and parameters selected by the application developer. Next at step 604, the method may provide the local server with an APIname Forwarding Web Server Template (AFWST). Thereafter, the local server may be hosted on the client site (for example, the SDK server 110) at step 606 and the IP address of the web server may be sent to all the application developers at step 608. The AFWST may be then integrated with a local storage unit at step 610. It then may integrate the AFWST with a data expiry unit at step 612 and with a Logging Rules Execution Unit (LREU) at step 614. Finally, it may integrate the LREU with a dashboard and a reporting module at step 616 and with the logging rules file and User Interface (UI) at step 618.

Figure 7:
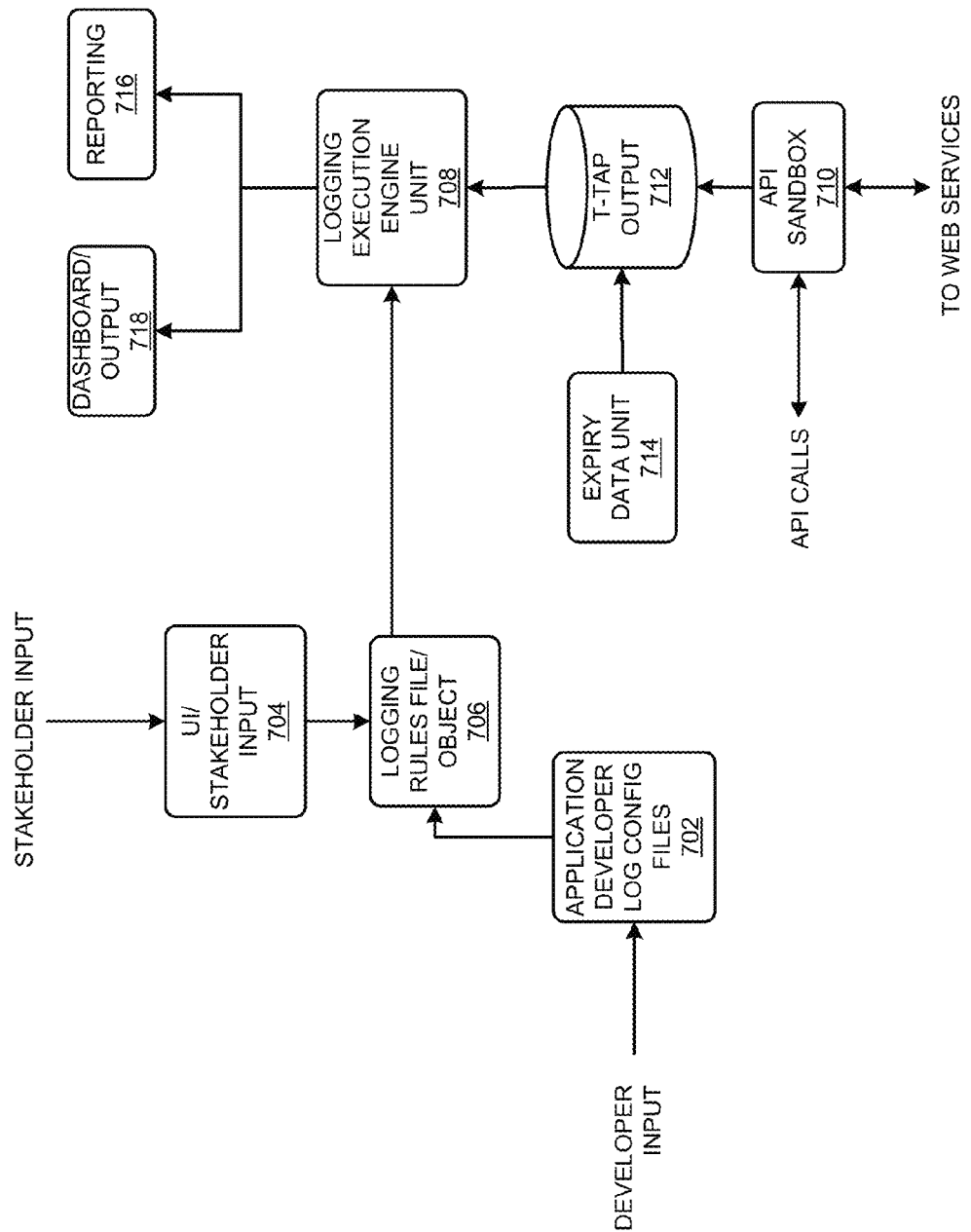
FIG. 7 illustrates an IP rerouting structure according to some embodiments of the present disclosure.

FIG. 7 illustrates an IP rerouting structure 700 obtained after the method 600 is executed in accordance with some embodiments. The application developers may specify their requirements for log generation and log obfuscation using schemas which may be supplied using end developer log configuration files 702. Similarly, a stakeholder may specify its requirements for log generation and log obfuscation by providing a schema input 704. Alternatively, the stakeholder may provide its requirements using a user interface (GUI) 704.

Then, the log configuration module 200 and log obfuscation module 400 may be implemented by processing each application developers' log generation specification and log obfuscation specification. Next, each application developer's log generation specification and log obfuscation specification may be overridden by the stakeholder's common log generation specification and common log obfuscation specification input, respectively, to obtain logging rules file 706. The logging rules file 706 may be provided to an LREU 707.

Further, an API sandbox 710 may be provided that may receive API calls from application developers/users, makes a copy of both the called API names and API parameters, and passes the API call to the original web services. In some embodiments, the API sandbox may be co-located at an enterprise software gateway. The API sandbox may be configured to receive all API calls from all applications, or only some API calls having specific API call names, or API calls only from a subset of applications (e.g., API calls originating from applications developed by specific application developers; applications of a specific type (e.g., games, business software, etc.), applications of a specific usage level, etc.), or others such as subsets of API calls. The integration of the SDK server 110 with the web service provider, and the passing of the API call to the original web service provider may be implemented via IP rerouting.

The local copy created by the API sandbox 710 may be provided via a T-Tap output 712 to the LREU 708. The T-Tap and API sandbox may ensure that the data and local API copy being operated on (e.g., by the LREU, dashboard UI, etc.) are not accessible to modules on the other side of the API sandbox, and other modules or data "outside" the API sandbox do not become involved in processes executed "within" the API sandbox 710. The LREU 708 may obtain data upon which to operate from a data expiry unit 714. For example, the data expiry unit 714 may store the API call names and API call parameters (e.g., input variables, source IP address, destination IP address, user ID, etc.) up to a time period beyond which the storage may be freed and new data may be stored on a First-In-First-Out (FIFO) basis. The data expiry unit 714 may be implemented as a relational database, file (e.g., CSV, text file, etc.), object stored in memory, etc. The LREU 708 may obtain logging and obfuscation rules for processing the API call from a logging/obfuscation rules file, object, or database, etc. (see 205). The results of the logging/obfuscation rules processing of the API calls may be reported 716 or displayed via a graphical user interface dashboard/output 718.

Figure 8:
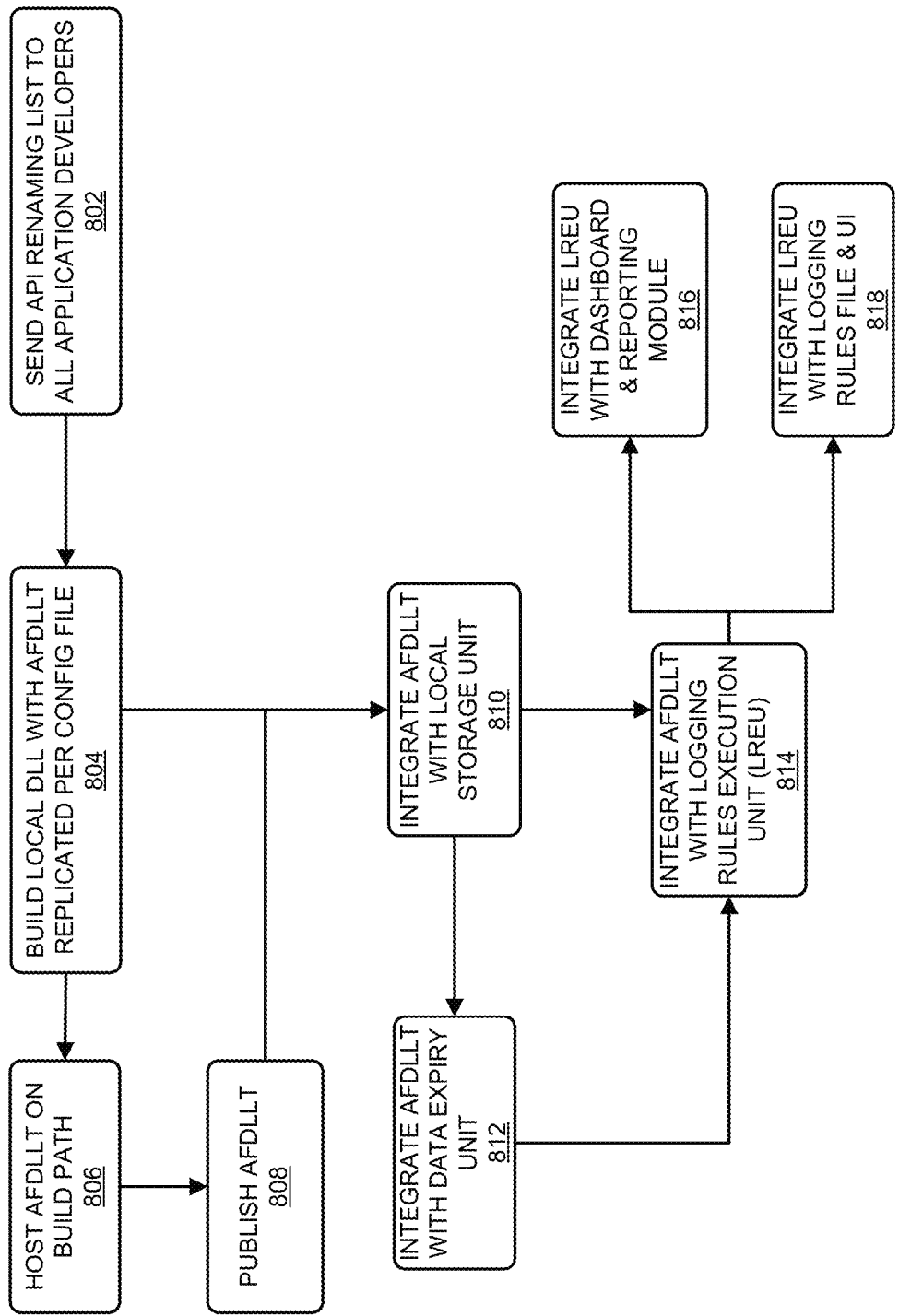
FIG. 8 is a flow diagram of a method for deploying lexical rerouting configuration according to some embodiments of the present disclosure.

FIG. 8 is a flow diagram of a method 800 for deploying a lexical rerouting configuration according to some embodiments of the present disclosure. The lexical rerouting structure obtained after method 800 is executed is explained in detail in conjunction with FIG. 9 below. At step 802, the binary code may send an API renaming list (for example, <APIname> <APIname_n>) to all application developers. Then at step 804, a local SDK DLL may be built with an APIname Forwarding DLL Template (AFDLLT) replicated for each configuration file. The AFDLLT may be hosted on the build path at step 806 and published to all application developers at step 808. The AFDLLT may be then integrated with local storage unit at step 810 and with data expiry unit at step 812. Thereafter, AFDLLT may be integrated with logging rules execution unit (LREU) at step 814. Finally, the LREU may be integrated with dashboard and reporting module at step 816 and with logging rules file and UI at step 818.

Figure 9:
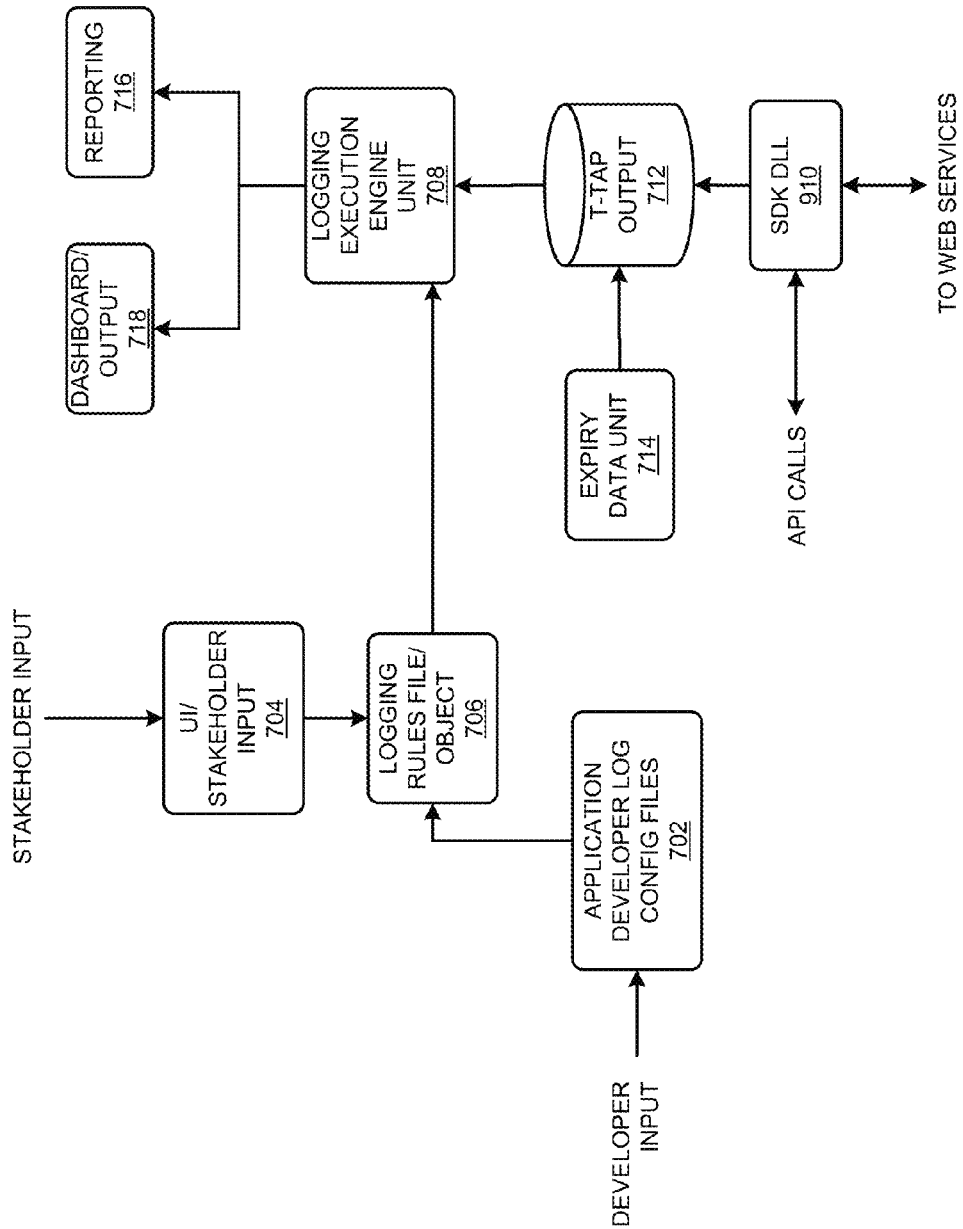
FIG. 9 illustrates a lexical rerouting structure according to some embodiments of the present disclosure.

FIG. 9 illustrates a lexical rerouting structure 900 in accordance with some embodiments. The lexical rerouting structure 900 may be similar to the IP rerouting structure 800. However, instead of the API sandbox 710, a DLL SDK 902 may be provided. The API calls may be renamed lexically at the source so that they are routed to the DLL SDK 902, prior to being forwarded to the web application. The DLL may performs a non-invasive copying and processing, entirely opaque to the application developers.

Additional illustrative embodiments are listed below. In some embodiments, an application logging system may be disclosed, comprising: a processor; and a memory device operatively connected to the processor and storing processor-executable instructions for: receiving an application programming interface (API) call for a service; parsing the API call to extract at least one of: an API call name; or one or more API call parameters; generating a log entry, using the at least one of: the API call name; or the one or more API call parameters, in accordance with an application logging schema specifying at least: a developer-specific set of variables to be logged and associated code line numbers, and a developer-independent (for the purposes of illustration but not to be limiting, provided by the stakeholder logging policy) set of variables to be logged and associated code line numbers; and storing the generated log entry. Generating the log entry may further comprise: obfuscating at least a portion of the log entry in accordance with a log obfuscation schema specifying at least: a developer-specific set of variables to be obfuscated and associated code line numbers, and a developer-independent (for the purposes of illustration but not to be limiting, provided by the stakeholder security policy) set of variables to be obfuscated and associated code line numbers. The application log schema and log obfuscation schema may be stored as a single schema. The service may be a web application service. One of: the developer-specific set of variables to be logged and associated code line numbers; and the developer-independent set of variables to be logged and associated code line numbers, may be a null set. One of: the developer-specific set of variables to be obfuscated and associated code line numbers; and the developer-independent set of variables to be obfuscated and associated code line numbers, may be a null set. The log obfuscation schema may specify an obfuscation method associated with a variable to be obfuscated. The obfuscation method associated with the variable to be obfuscated may include one of: replacing a variable name with a numeric code; replacing personally identifiable information with a token; or replacing a data attachment with metadata. The obfuscation method may include encryption using an application-specific key. The memory device may further store instructions for: generating at least one of: a new API call name; or a new API call address, using the extracted at least one of: the API call name; or the one or more API call parameters; generating a new API call for the service using the generated at least one of: the new API call name; or the new API call address; and providing the generated new API call for the service. The new API call name may be generated, by extracting a string subset of the API call name. An API call address for the generated new API call may be the same as an API call address for the received API call for the service. Alternatively, the new API call address may be generated, by providing the API call name as input to a lookup table. An API call name for the generated new API call may be the same as the API call name.

In some embodiments, an application logging method may be disclosed, comprising: receiving an application programming interface (API) call for a service; parsing the API call to extract at least one of: an API call name; or one or more API call parameters; generating a log entry, using the at least one of: the API call name; or the one or more API call parameters, in accordance with an application logging schema specifying at least: a developer-specific set of variables to be logged and associated code line numbers, and a developer-independent (for the purposes of illustration but not to be limiting, provided by the stakeholder logging policy) set of variables to be logged and associated code line numbers; and storing the generated log entry. Generating the log entry may further comprise: obfuscating at least a portion of the log entry in accordance with a log obfuscation schema specifying at least: a developer-specific set of variables to be obfuscated and associated code line numbers, and a developer-independent (for the purposes of illustration but not to be limiting, provided by the stakeholder security policy) set of variables to be obfuscated and associated code line numbers. The application log schema and log obfuscation schema may be stored as a single schema. The service may be a web application service. One of: the developer-specific set of variables to be logged and associated code line numbers; and the developer-independent set of variables to be logged and associated code line numbers, may be a null set. One of: the developer-specific set of variables to be obfuscated and associated code line numbers; and the developer-independent set of variables to be obfuscated and associated code line numbers, may be a null set. The log obfuscation schema may specify an obfuscation method associated with a variable to be obfuscated. The obfuscation method associated with the variable to be obfuscated may include one of: replacing a variable name with a numeric code; replacing personally identifiable information with a token; or replacing a data attachment with metadata. The obfuscation method may include encryption using an application-specific key. The method may further comprise: generating at least one of: a new API call name; or a new API call address, using the extracted at least one of: the API call name; or the one or more API call parameters; generating a new API call for the service using the generated at least one of: the new API call name; or the new API call address; and providing the generated new API call for the service. The new API call name may be generated, by extracting a string subset of the API call name. An API call address for the generated new API call may be the same as an API call address for the received API call for the service. Alternatively, the new API call address may be generated, by providing the API call name as input to a lookup table. An API call name for the generated new API call may be the same as the API call name.

In some embodiments, a non-transitory computer-readable medium storing computer-executable application logging instructions may be disclosed, the instructions comprising instructions for: receiving an application programming interface (API) call for a service; parsing the API call to extract at least one of: an API call name; or one or more API call parameters; generating a log entry, using the at least one of: the API call name; or the one or more API call parameters, in accordance with an application logging schema specifying at least: a developer-specific set of variables to be logged and associated code line numbers, and a developer-independent (for the purposes of illustration but not to be limiting, provided by the stakeholder logging policy) set of variables to be logged and associated code line numbers; and storing the generated log entry. Generating the log entry may further comprise: obfuscating at least a portion of the log entry in accordance with a log obfuscation schema specifying at least: a developer-specific set of variables to be obfuscated and associated code line numbers, and a developer-independent (for the purposes of illustration but not to be limiting, provided by the stakeholder security policy) set of variables to be obfuscated and associated code line numbers. The application log schema and log obfuscation schema may be stored as a single schema. The service may be a web application service. One of: the developer-specific set of variables to be logged and associated code line numbers; and the developer-independent set of variables to be logged and associated code line numbers, may be a null set. One of: the developer-specific set of variables to be obfuscated and associated code line numbers; and the developer-independent set of variables to be obfuscated and associated code line numbers, may be a null set. The log obfuscation schema may specify an obfuscation method associated with a variable to be obfuscated. The obfuscation method associated with the variable to be obfuscated may include one of: replacing a variable name with a numeric code; replacing personally identifiable information with a token; or replacing a data attachment with metadata. The obfuscation method may include encryption using an application-specific key. The medium may further store instructions for: generating at least one of: a new API call name; or a new API call address, using the extracted at least one of: the API call name; or the one or more API call parameters; generating a new API call for the service using the generated at least one of: the new API call name; or the new API call address; and providing the generated new API call for the service. The new API call name may be generated, by extracting a string subset of the API call name. An API call address for the generated new API call may be the same as an API call address for the received API call for the service. Alternatively, the new API call address may be generated, by providing the API call name as input to a lookup table. An API call name for the generated new API call may be the same as the API call name.

The proposed method and system for log generation can be further extended as follows:
 a. The log generation method, in the current disclosure, may utilize a passive 1-way push approach.
 b. It may allow the individual developers to specify the log generation requirements, as well as allows the stakeholder to state the system wide common log generation requirements. By a joinder of these requirements, the current disclosure may create the logs. Here, the log generation requirements may be passively pushed 1-way from the developers to the system.
 c. This idea may also be extended into a 2-way/bi-directional and real-time log requirements update mechanism, as follows. A triage or debugging team may also provide update requests to the log generation requirements. The system may support a bi-directional flow of log creation request support mechanism—a) Forward Path: from the developers (as is described in detail in this disclosure), and b) Reverse Path: from the debug or triage team. Once the log generation requirements are specified, they may be processed in the same manner regardless of whether they originated from the developer side or the triage team side.
 d. A real-time dashboard support may be provided for the triage team and other stakeholders in connection with the logs, usage of the logs and content therein.

The proposed method and system for log generation can be further extended as follows:
 a. The log generation requirements presented in this disclosure may be a free-form description from the developers. For example, the developers may specify any variable or data type for logging at a specific code segment. While, this is flexible and provides maximum leeway to the developer to state his/her logging requirement, this approach may not allow automation of the IDE (e.g., eclipse or Visual Studio) highlighted instances of the same variable across the same module. As an alternative provided by the system, if the developer wishes to take advantage of the IDE provided feature to highlight all the instances of the same variable, then the developer can explicitly state each such variable for automated log creation.
 b. The logging requirement can be updated to be on a per-variable basis across the entire module (instead of being for specific code lines). In doing so, the developer would inherit the benefits of the IDE (to pick up all instances of the same variable) as well as retain the customizable log generation ability—joining the benefits of both the features.
 c. Practical benefits of this idea extension would include, but not be limited to, a ready integration with the commercialized and popular IDEs. It is to be understood that such practical benefits may be provided for in some embodiments of the disclosure, but not necessarily in all embodiments.

The proposed method and system for log obfuscation can be further extended as follows:

a. The obfuscated log need not be encrypted with only one master key. The log can be encrypted with a set of keys, each specific to a specific user role in the triage team. The triage or debug team members, therefore, need not rely on one master or admin key to decrypt the entire log and carry a risk of inadvertent exposure. Selected parts of the log file may be decrypted by individual keys, and 2-pair or k-pair keys can decrypt progressively broader segments of the log file.

b. In general, the multi-key encryption approach can support the RBAC (role-based access control) model of user privileges.

c. Practical benefits of the proposed approach include, but are not limited to, i) improved protection of the encrypted logs (aka. reduced potential of inadvertent exposure from a single key leak), ii) support of multiple access privileges and roles in the triage team, iii) establishment of roles and access hierarchy in the triage team. It is to be understood that such practical benefits may be provided for in some embodiments of the disclosure, but not necessarily in all embodiments.

The proposed method and system for log generation and log obfuscation can be further extended as follows for the storage expiration module:

a. The system may provide support of a rule based record expiration module.

b. Such rules may be (date, time) stamp based, or developer ID based, or application ID based, or specific variable linked (e.g., credit card data or tokens).

c. Such rules can capture any other application specific business logic, as well.

d. Practical benefits include, but are not limited to, improved storage management, support of billing and revenue stream creation for the storage module, improved audit support (being able to store certain audit specific data without the risk of time delimited record delete). It is to be understood that such practical benefits may be provided for in some embodiments of the disclosure, but not necessarily in all embodiments.

Computer System

FIG. 10 is a block diagram of an exemplary computer system for implementing embodiments consistent with the present disclosure. Variations of computer system 1001 may be used for implementing all the computing systems that may be utilized to implement the features of the present disclosure. Computer system 1001 may comprise a central processing unit ("CPU" or "processor") 1002. Processor 1002 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1002 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1002 may be disposed in communication with one or more input/output (I/O) devices via I/O interface 1003. The I/O interface 1003 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1003, the computer system 1001 may communicate with one or more I/O devices. For example, the input device 1004 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1005 may be a printer, fax machine, video display (e.g., cathode ray tube (CRT), liquid crystal display (LCD), light-emitting diode (LED), plasma, or the like), audio speaker, etc. In some embodiments, a transceiver 1006 may be disposed in connection with the processor 1002. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1002 may be disposed in communication with a communication network 1008 via a network interface 1007. The network interface 1007 may communicate with the communication network 1008. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1008 may include, without limitation, a direct interconnection, local area network (LAN), wide area network (WAN), wireless network (e.g., using Wireless Application Protocol), the Internet, etc. Using the network interface 1007 and the communication network 1008, the computer system 1001 may communicate with devices 1010, 1011, and 1012. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1001 may itself embody one or more of these devices.

In some embodiments, the processor 1002 may be disposed in communication with one or more memory devices (e.g., RAM 1013, ROM 1014, etc.) via a storage interface 1012. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1016, user interface application 1017, web browser 1018, mail server 1019, mail client 1020, user/application data 1021 (e.g., any data variables or data records discussed in this disclosure), etc. The operating system 1016 may facilitate resource management and operation of the computer system 1001. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1017 may facilitate display, execution, interaction, manipulation, or operation of program components through textual or graphical facilities. For example, user interfaces may provide computer interaction interface elements on a display system operatively connected to the computer system 1001, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1001 may implement a web browser 1018 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1001 may implement a mail server 1019 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1001 may implement a mail client 1020 stored program component. The mail client may be a mail viewing application, such as Apple Mail, Microsoft Entourage, Microsoft Outlook, Mozilla Thunderbird, etc.

In some embodiments, computer system 1001 may store user/application data 1021, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for log generation and log obfuscation using software development kits (SDKs). The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An application logging configuration system, comprising:
   a processor; and
   a memory device operatively connected to the processor and storing processor-executable instructions for:
   obtaining, for an application, a developer-specific log generation schema specifying at least a first developer-specific set of variables of which values during an execution of the application are to be logged and code line numbers associated with code lines of the application that include the first developer-specific set of variables;
   obtaining a developer-independent log generation schema specifying at least a first developer-independent set of variables of which values during an execution of the application are to be logged and code line numbers associated with code lines of the application that include the first developer-independent set of variables;
   extracting the first developer-specific and developer-independent sets of variables from respectively the obtained developer-specific log generation schema and the obtained developer-independent log generation schema;
   generating an application logging schema specifying, for each code line of at least part of the application, a first set of variables of which values during an execution of the application are to be logged, the first set of variables including a combination of at least some of the extracted first developer-specific set of variables and at least some of the extracted first developer-independent set of variables;

generating a log obfuscation schema specifying, for each code line of at least part of the application, a second set of variables of which values during an execution of the application are to be obfuscated from logging;

generating a single schema to include the application logging schema and log obfuscation schema;

storing the single schema; and providing the single schema for log generation during an execution of the application.

2. The system of claim 1, the memory device further storing instructions for:

obtaining a developer-specific log obfuscation schema specifying at least a second developer-specific set of variables of which values during an execution of the application are to be obfuscated from logging and code line numbers associated with code lines that include the second developer-specific set of variables;

obtaining a developer-independent log obfuscation schema specifying at least a second developer-independent set of variables of which values during an execution of the application are to be obfuscated from logging and code line numbers associated with code lines that include the second developer-independent set of variables; and extracting the second developer-specific and developer-independent sets of variables from respectively the obtained developer-specific log obfuscation schema and the obtained developer-independent log generation schema;

wherein the second set of variables of the log obfuscation schema include a combination of at least some of the extracted second developer-specific set of variables and at least some of the extracted second developer-independent sets of variables.

3. The system of claim 1, wherein the application is a web service application.

4. The system of claim 1, wherein one of: the first developer-specific set of variables to be logged and associated code line numbers; and the first developer-independent set of variables to be logged and associated code line numbers, is a null set.

5. The method of claim 1, wherein the developer-independent log generation schema is utilized to generate application logging schemas for all developers of the application.

6. The system of claim 2, wherein one of: the second developer-specific set of variables to be obfuscated and associated code line numbers; and the second developer-independent set of variables to be obfuscated and associated code line numbers, is a null set.

7. The system of claim 2, wherein the log obfuscation schema specifies an obfuscation method associated with a variable to be obfuscated.

8. The system of claim 7, wherein the obfuscation method associated with the variable to be obfuscated includes one of: replacing a variable name with a numeric code; replacing personally identifiable information with a token; or replacing a data attachment with metadata.

9. The system of claim 7, wherein the obfuscation method includes encryption using an application-specific key.

10. The system of claim 1, wherein the application logging schema is associated with a timestamp configured to indicate a time when the application logging schema expires.

11. An application logging configuration method, comprising:

obtaining, for an application, a developer-specific log generation schema specifying at least a first developer-specific set of variables of which values during an execution of the application are to be logged and code line numbers associated with code lines of the application that include the first developer-specific set of variables;

obtaining a developer-independent log generation schema specifying at least a first developer-independent set of variables of which values during an execution of the application are to be logged and code line numbers associated with code lines of the application that include the first developer-independent set of variables;

extracting the first developer-specific and developer-independent sets of variables from respectively the obtained developer-specific log generation schema and the obtained developer-independent log generation schema;

generating an application logging schema specifying, for each code line of at least part of the application, a first set of variables of which values during an execution of the application are to be logged, the first set of variables including a combination of at least some of the extracted first developer-specific set of variables and at least some of the extracted first developer-independent set of variables;

generating a log obfuscation schema specifying, for each code line of at least part of the application, a second set of variables of which values during an execution of the application are to be obfuscated from logging;

generating a single schema to include the application logging schema and log obfuscation schema;

storing the single schema; and providing the single schema for log generation during an execution of the application.

12. The method of claim 11, further comprising:

obtaining a developer-specific log obfuscation schema specifying at least a second developer-specific set of variables of which values during an execution of the application are to be obfuscated from logging and code line numbers associated with code lines that include the second developer-specific set of variables;

obtaining a developer-independent log obfuscation schema specifying at least a second developer-independent set of variables of which values during an execution of the application are to be obfuscated from logging and code line numbers associated with code lines that include the second developer-independent set of variables; and extracting the second developer-specific and developer-independent sets of variables from respectively the obtained developer-specific log obfuscation schema and the obtained developer-independent log obfuscation schema;

wherein the second set of variables of the log obfuscation schema include a combination of at least some of the extracted second developer-specific set of variables and at least some of the extracted second developer-independent sets of variables.

13. The method of claim 11, wherein the application is a web service application.

14. The method of claim 11, wherein one of: the first developer-specific set of variables to be logged and associated code line numbers; and the first developer-independent set of variables to be logged and associated code line numbers, is a null set.

15. The method of claim 11, wherein the developer-independent log generation schema is utilized to generate application logging schemas for all developers of the application.

16. The method of claim 12, wherein one of: the second developer-specific set of variables to be obfuscated and associated code line numbers; and the second developer-independent set of variables to be obfuscated and associated code line numbers, is a null set.

17. The method of claim 12, wherein the log obfuscation schema specifies an obfuscation method associated with a variable to be obfuscated.

18. The method of claim 17, wherein the obfuscation method associated with the variable to be obfuscated includes one of: replacing a variable name with a numeric code; replacing personally identifiable information with a token; or replacing a data attachment with metadata.

19. The method of claim 17, wherein the obfuscation method includes encryption using an application-specific key.

20. A non-transitory computer-readable medium storing computer-executable application logging configuration instructions, comprising instructions for:
obtaining, for an application, a developer-specific log generation schema specifying at least a first developer-specific set of variables of which values during an execution of the application are to be logged and code line numbers associated with code lines of the application that include the first developer-specific set of variables;
obtaining a developer-independent log generation schema specifying at least a first developer-independent set of variables of which values during an execution of the application are to be logged and code line numbers associated with code lines of the application that include the first developer-independent set of variables;
extracting the first developer-specific and developer-independent sets of variables from respectively the obtained developer-specific log generation schema and the obtained developer-independent log generation schema;
generating an application logging schema specifying, for each code line of at least part of the application, a first set of variables of which values during an execution of the application are to be logged, the first set of variables including a combination of at least some of the first developer-specific set of variables and at least some of the first developer-independent set of variables;
generating a log obfuscation schema specifying, for each code line of at least part of the application, a second set of variables of which values during an execution of the application are to be obfuscated from logging;
generating a single schema to include the application logging schema and log obfuscation schema;
storing the single schema; and
providing the single schema for log generation during an execution of the application.

21. The medium of claim 20, further storing instructions for:
obtaining a developer-specific log obfuscation schema specifying at least a second developer-specific set of variables of which values during an execution of the application are to be obfuscated from logging and code line numbers associated with code lines of the application that include the second developer-specific set of variables;
obtaining a developer-independent log obfuscation schema specifying at least a second developer-independent set of variables of which values during an execution of the application are to be obfuscated from logging and code line numbers associated with code lines of the application that include the second developer-independent set of variables; and
extracting the second developer-specific and developer-independent sets of variables and associated code line numbers from respectively the obtained developer-specific log obfuscation schema and the obtained developer-independent log obfuscation schema;
wherein the first set of variables of the log obfuscation schema include a combination of at least some of the extracted second developer-specific variables and at least some of the extracted second developer-independent sets of variables.

22. The medium of claim 20, wherein the application is a web service application.

23. The medium of claim 20, wherein one of: the first developer-specific set of variables to be logged and associated code line numbers; and the first developer-independent set of variables to be logged and associated code line numbers, is a null set.

24. The medium of claim 20, wherein the developer-independent log generation schema is utilized to generate application logging schemas for all developers of the application.

25. The medium of claim 21, wherein one of: the second developer-specific set of variables to be obfuscated and associated code line numbers; and the second developer-independent set of variables to be obfuscated and associated code line numbers, is a null set.

26. The medium of claim 21, wherein the log obfuscation schema specifies an obfuscation method associated with a variable to be obfuscated.

27. The medium of claim 26, wherein the obfuscation method associated with the variable to be obfuscated includes one of: replacing a variable name with a numeric code; replacing personally identifiable information with a token; or replacing a data attachment with metadata.

28. The medium of claim 26, wherein the obfuscation method includes encryption using an application-specific key.

* * * * *